Feb. 24, 1953 D. S. McCULLOUGH 2,629,292
MACHINE TOOL UNIT
Filed June 7, 1950 4 Sheets-Sheet 1
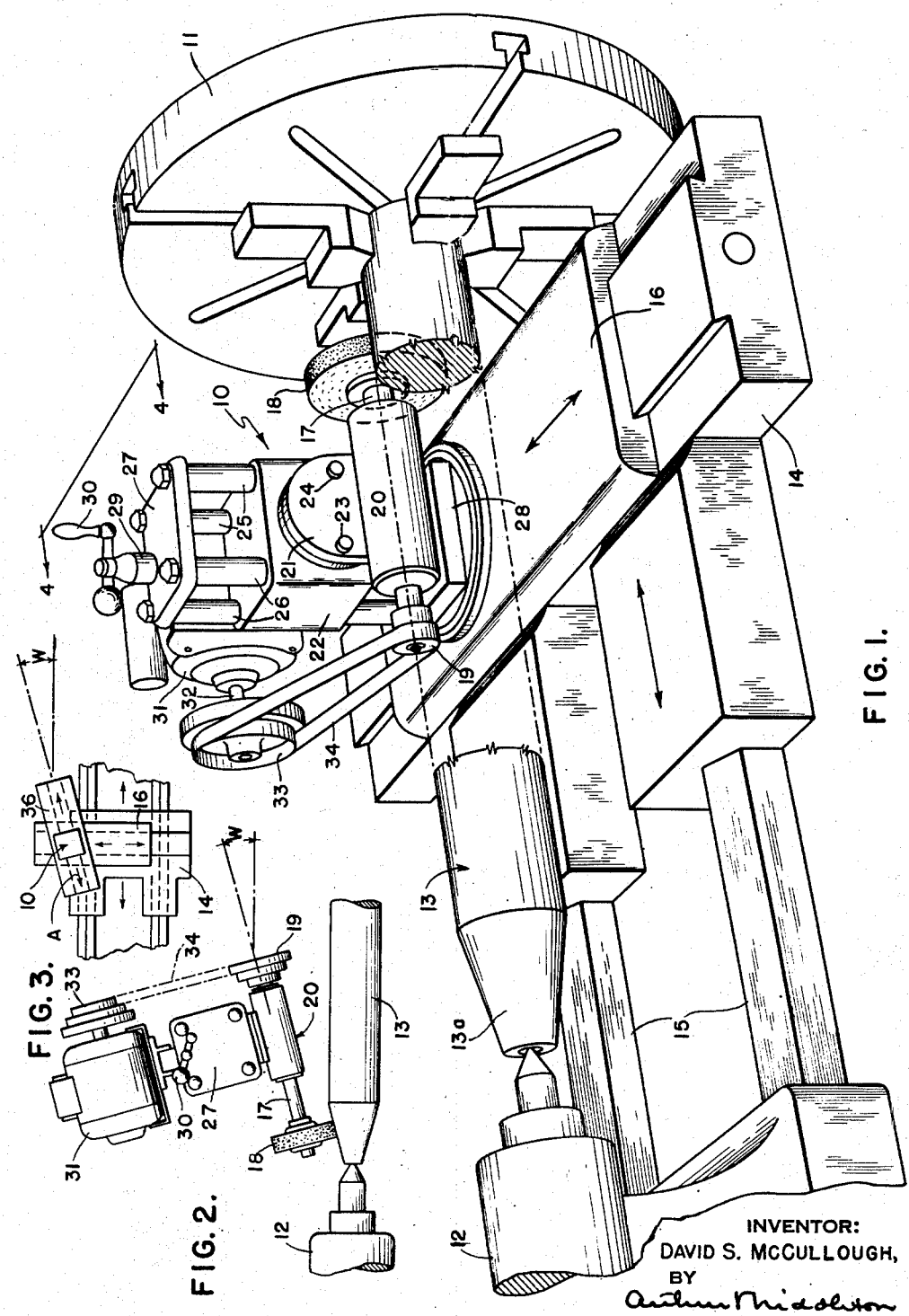
INVENTOR:
DAVID S. McCULLOUGH,
BY
Arthur Middleton
ATTORNEY Feb. 24, 1953  D. S. McCULLOUGH  2,629,292
MACHINE TOOL UNIT
Filed June 7, 1950  4 Sheets-Sheet 2

INVENTOR:
DAVID S. McCULLOUGH,
BY
Arthur Middleton
ATTORNEY

INVENTOR:
DAVID S. McCULLOUGH,
BY
Arthur Middleton
ATTORNEY

Feb. 24, 1953

D. S. McCULLOUGH 2,629,292

MACHINE TOOL UNIT

Filed June 7, 1950

INVENTOR:
DAVID S. McCULLOUGH,
BY
Arthur Middleton
ATTORNEY

UNITED STATES PATENT OFFICE 2,629,292

MACHINE-TOOL UNIT

David Sandridge McCullough, New York, N. Y.

Application June 7, 1950, Serial No. 166,577

5 Claims. (Cl. 90—15)

This invention relates to improvements in individually motor-driven supplementary machine tool units, that is, units which are attachable to a variety of standard basic machine tools to enable the basic machine tool to perform an additional machining operation.

Such an attachable unit makes it possible, after a work-piece has been set up on the basic machine tool and after that tool has performed its machining operation upon the work, to have the work subjected to an additional operation without change of the basic work set-up, and indeed dispensing with the need for a complete extra basic machine tool for performing the additional machining operation. The supplementary tool unit adds an independently driven working tool, or substitutes for the working tool of the basic machine, while utilizing the basic work set-up. The basic work set-up may be of the kind that holds the work stationary or it may involve rotation or rectilinear motion of the work-piece, while the supplementary tool is of the rotary kind, such as a milling cutter or grinding wheel, individually driven by the motor of the supplementary unit.

Indeed, this invention relates to improvements in individually motorized supplementary tool units, such as shown in my Patent No. 2,497,735, which unit can be attached to a basic machine tool, for example, by being bolted or clamped to the carriage of a lathe, to the tool holder of a boring mill, to the bridge of a planer, or to the over-arm of a milling machine, in order to perform the additional machining operation.

This invention also relates to improvements of general class of supplementary motorized machine tool equipment known as "tool post grinders."

A supplementary unit on the order of that disclosed in my aforementioned patent or of tool post grinders comprises a frame or a base, whereby the unit is attachable, for example, to the carriage of a lathe; a tool support upon the frame; a rotary tool shaft mounted upon the near side of the support that faces the work-piece and carrying the cutting or grinding tool; a drive motor mounted upon the opposite or far side of the support and with its axis of rotation extending parallel to the axis of the tool shaft; and a drive-transmitting means such as a belt drive disposed at one side of the tool support between one end of the motor shaft and a corresponding free end of the tool shaft while the opposite free end carries the tool.

Among the objects of this invention is to add to the usefulness of this type of equipment by providing greater flexibility in its adaptation, greater precision in its machining operation, and reduced preparation and set-up time when performing metal cutting operations such as milling, drilling and grinding, particularly when machining large or cumbersome work pieces that offer interference to easy machining.

One of the difficulties in obtaining full use of the usual supplementary tool unit arises from the condition that the cutting tool is disposed at one side of the unit, whereas the work often presents work surfaces opposed to one another as in milling both faces of a shoulder on a shaft, in which case one surface but not the other may be accessible to the tool; or a difficulty may arise where the work-holding devices on the basic machine tool would interfere with positioning the supplementary tool for complete machining of a work-piece in one continuous operation.

Known supplementary units provide for detaching or disassembly of the tool shaft housing and reassembly in reversed position, resulting in loss of time, of precision in the machining operation, and impaired protection to parts being disassembled such as bearings. Other disadvantages in prior devices are loss of rigidity of the set-up when a change-over is made, or that the belt driving the tool shaft prevents proper guarding of a grinding wheel when the grinding wheel is mounted at the same end of the shaft as are the pulley and belt.

In order to attain its objects this invention provides practical, simple, accurate, and efficient means for interchanging the tool end with the driven end on the tool shaft, and it avoids the above disadvantages by providing a tool shaft with substantially identical ends, journaled in a housing, both ends being adapted for mounting either a tool or a driving pulley.

One form which the tool shaft may take is that of being provided with hollow or tapered sockets at each end, so that a tool or tool-carrying arbor may be seated in the one socket, while a similar arbor carrying a drive element, pulley or sprocket, may be seated in the other socket, both arbors thus being adapted to rotate unitary with the body portion. The two arbors are interchangeable, so that the disposition of the tool end and of the drive end of the tool shaft are rendered optional with respect to each other and with respect to the work-piece. This feature is combined with mounting means for the drive motor so that the motor can be bodily reversed so as to have its drive sheave-carrying end coordinated to the pulley-carrying end of the tool shaft.

With the above and other objects in view, the invention consists in the construction and novel combination and arrangement of parts hereinafter fully described, illustrated in the accompanying drawings and pointed out in the claims hereto appended, it being understood that various changes in the form, proportions, and minor details of construction, within the scope of the claims or equivalents of their requirements, may be resorted to without departing from the spirit or sacrificing any of the advantages of the invention.

In the drawings:

Figure 1 is a perspective view showing one embodiment of the invention in which the supplementary tool unit carrying a grinding wheel at one end of the tool shaft is installed upon a lathe.

Figure 2 is a semi-diagrammatic top view of an installation similar to Figure 1, although with a grinding wheel mounted upon the opposite end of the tool shaft, as well as with the tool disposed for taper grinding of the tail stock end of the work.

Figure 3 is a diagrammatic top view of a lathe carriage arrangement for executing the taper grinding operation of Figure 2.

Figure 4:
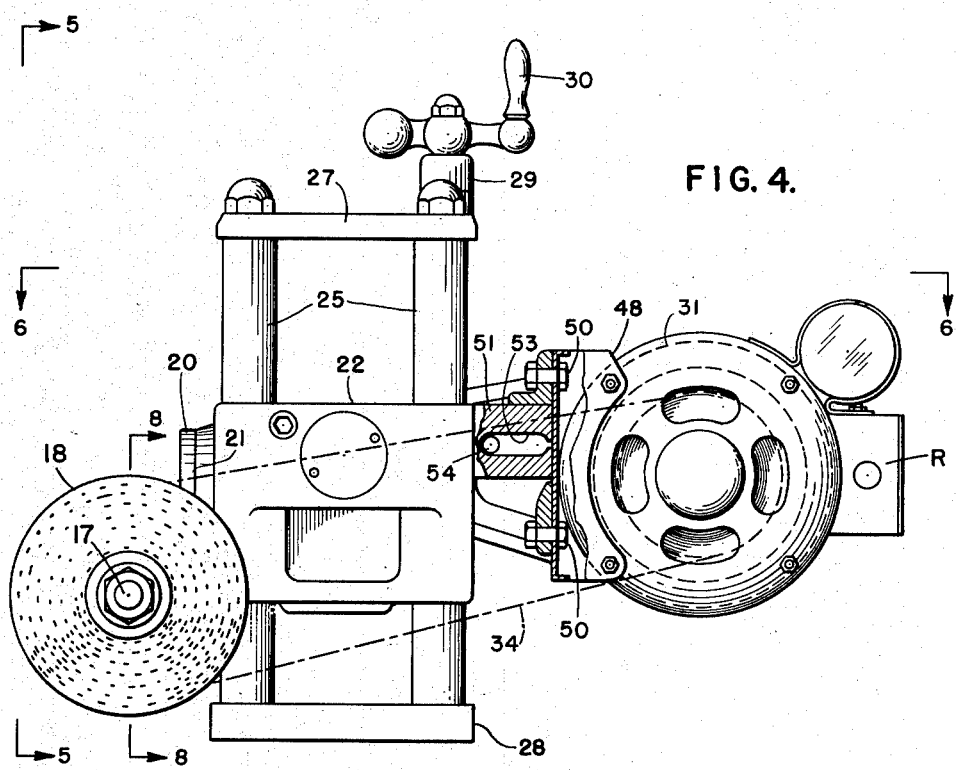
Figure 4 is an enlarged side view of the supplementary tool unit taken on line 4—4 of Figure 1.
Figure 5:
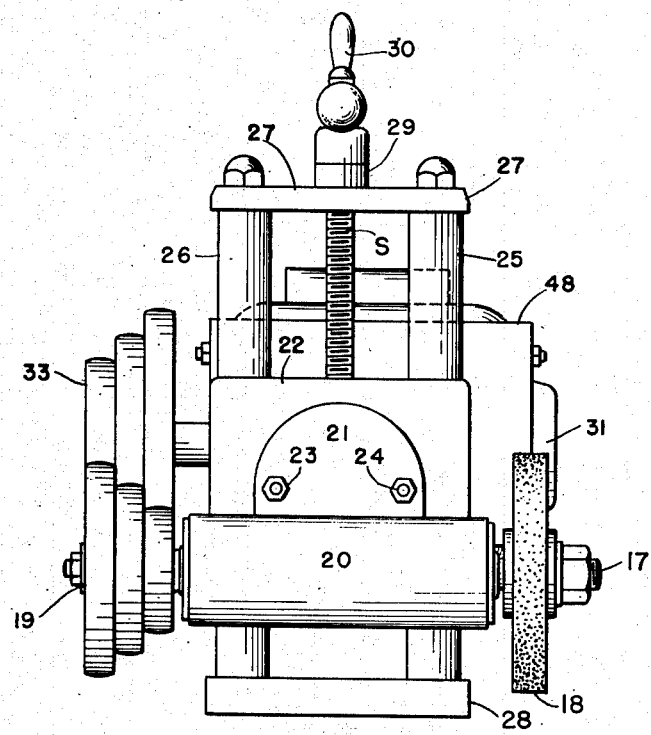
Figure 5 is a view of the supplementary tool unit taken on line 5—5 of Figure 4.

As an example of installation the perspective view of Figure 1 shows a supplementary machine tool unit 10 installed upon a lathe which is indicated by such conventional parts as a rotary chuck 11 and a tail stock 12 both mounted upon the machine frame, with a work-piece 13 held between the chuck and the tail stock, a main carriage 14 movable upon ways 15 constituting part of the machine frame and paralleling the work-piece, and a secondary carriage 16 in turn mounted upon the main carriage for movement in a direction transversely of the ways and also termed the transverse carriage. The work-piece 13 is here shown by way of example as a shaft-like member having a tapered end portion 13ª held by the tail stock.

The supplementary unit 10 being mounted upon the transverse carriage 16 replaces the cutting tool or tool holder usually provided upon the transverse carriage for performing ordinary turning operations on the lathe.

The supplementary unit 10 as shown in Figure 1 comprises a tool shaft 17 having its intermediate portion supported in a bearing for rotation and having a free end extending from either end of the bearing, with a grinding wheel 18 fixed upon that end of the shaft that points towards the chuck 11, and a driven pulley 19 fixed upon the other end of the shaft that points towards the tail stock 12. The tool shaft 17 extends parallel to the longitudinal axis of work-piece 13 and rotates in a bearing 20 having a bracket 21 whereby it is fastened upon a tool carrier 22 as by a pair of screw bolts 23 and 24.

The tool carrier 22 may be mounted on, and movable vertically upon a vertical guide frame or standard represented by two pairs of round posts 25 and 26. These four posts are rigidly interconnected at their top ends by a top plate 27 and at their bottom ends by a base plate 28, so as to constitute a rigid vertical frame defining the vertical movement of the tool carrier thereon yet securing it against rotation. This vertical movement is controllable by a screw spindle S having bearings in the top plate, indicated by portion 29, to which is fixed a crank handle 30. Turning of the crank handle will move the tool carrier 22 upwardly or downwardly to the proper working position relative to the work-piece 13. Suitable means are provided for securing the tool carrier in its adjusted operating position upon the vertical frame. The transverse carriage 16 may be fixed upon the main carriage 14 in a position adjusted relative to the work-piece.

Upon the far side of the tool carrier is mounted a drive motor 31 the shaft 32 of which has thereon a drive sheave 33 which through a belt 34 imparts rotation to the pulley 19 which is fixed upon that end of the tool shaft opposite the grinding wheel that points towards the tail stock of the lathe.

It is easily seen that with this arrangement of the pulley and belt at whichever end is opposite the grinding wheel, the belt avoids the usual interference to mounting a wheel guard that exists at one end when the end-for-end interchangeability feature is missing.

With the grinding wheel properly adjusted to the work-piece the primary carriage may be fed along the ways 15 and along the work-piece in lathe operating fashion by the usual horizontal lead spindle, to allow the supplementary unit 10 to perform the grinding opertaion.

For grinding the taper portion 13ª of the work-piece, the bearing 20 and the pulley 19 would interfere with the tail stock 12, if the unit 10 were to be moved towards the tail stock with the grinding wheel 18 mounted as shown in Figure 1.

Figures 2 and 3 show semi-diagrammatically and in plan view an alternative mode of installing and using the supplementary unit 10 upon the lathe, which is in accordance with this invention. That installation requires that there be mounted upon the transverse carriage 16 a third slide or carriage 36 upon which in turn is diagrammatically indicated the supplementary unit 10 bodily movable thereon in a horizontal direction of arrows A although at an angle W with respect to the longitudinal axis of the work-piece. This installation is for grinding the tapered end portion 13ª of the work-piece, after the main carriage 14 has been fixed in its proper position upon tracks 15.

For that purpose and in distinction from the Figure 1 installation it will be noted that due to what is in effect an end for end reversal of the tool shaft, the grinding wheel 18 is now shown to be at that end of the shaft which points towards the tail stock making the wheel 18 accessible to the taper 13ª, while the pulley 19 is shown upon the opposite end of the shaft pointing towards the chuck, and so not interfering with tail stock 12. Accordingly, the motor 31, is now shown mounted in a position which is end for end the reverse of that shown in Figure 1. A reversing switch for the motor is indicated at R, in order that the direction of rotation of the grinding wheel may be rendered identical for both the Figure 1 and the Figure 2 mode of installation in relation to the lathe and the work-piece. Continuation of the same direction of rotation is particularly desirable in order to keep the surfaces ground by the wheel in its two positions alike in appearance, which can not be done if the direction of grinding is reversed.

Figure 6:
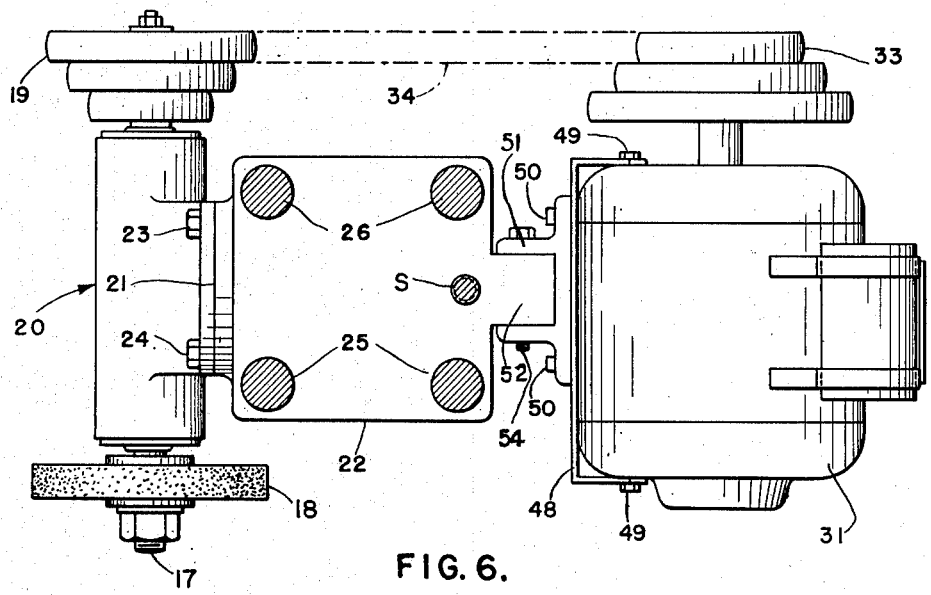
Figure 6 is cross section on line 6—6 of Figure 4.
Figure 7:
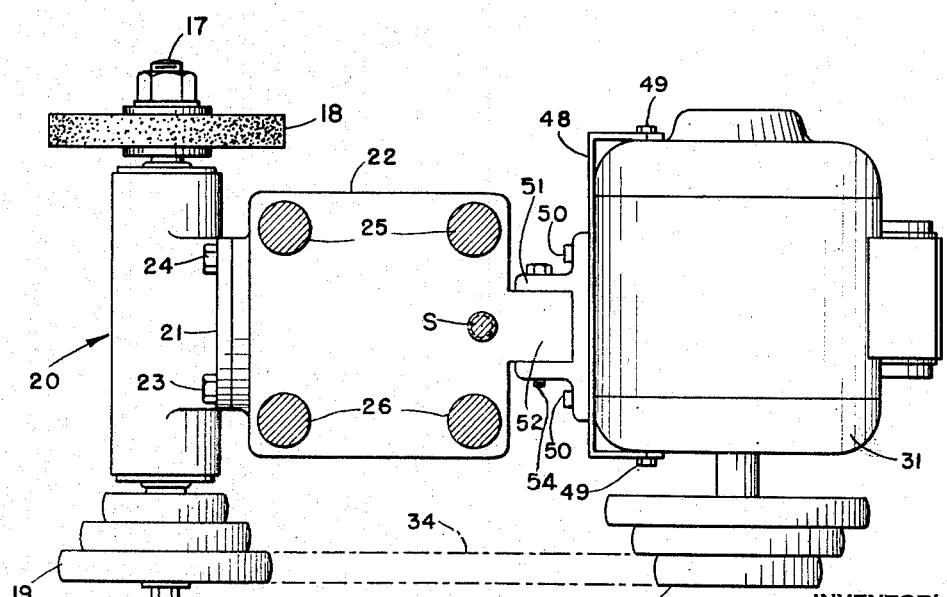
Figure 7 is a view similar to Figure 6, although with the tool and the pulley interchanged.

The two modes of installation and of employment of the supplementary unit 10, which are optional according to this invention, are shown in an enlarged scale and in juxtaposition in the plan view of Figures 6 and 7.

Figure 8:
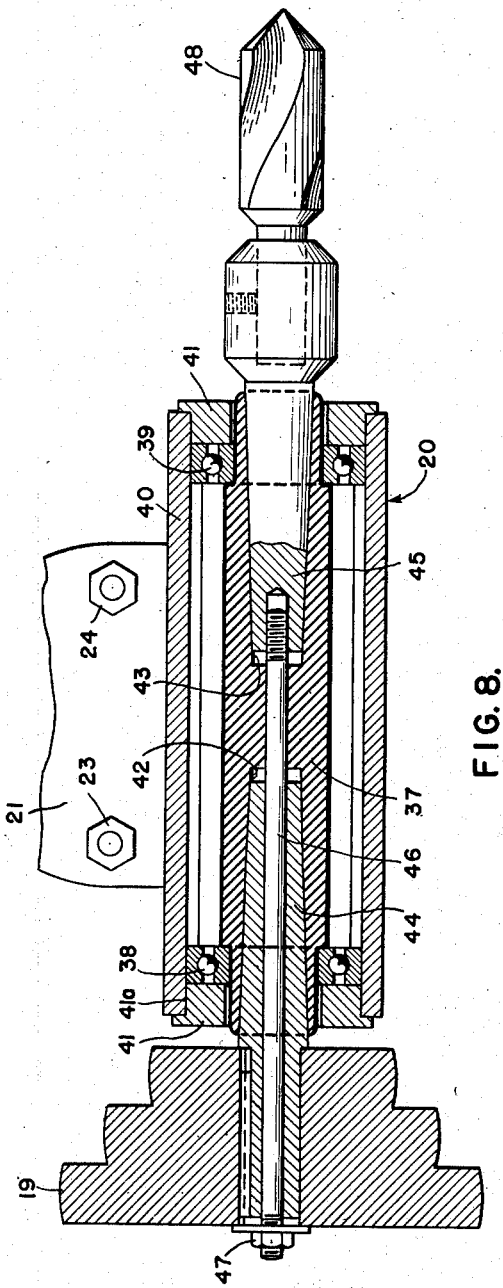
Figure 8 is a part-sectional view of the tool carrier taken on line 8—8 of Figure 4, except that a drill and its arbor have been substituted for the grinding wheel, in order to show how other tools may be mounted.

Referring to the remaining Figures 8, 9 there will now be described in detail those features in the supplementary unit 10 which make it possible to readily condition the unit for either one of the modes of installation represented in Figures 1 and 2 or in Figures 6 and 7.

What has been designated in Figures 1 to 5 as the tool shaft 18 in fact constitutes a composite member comprising a body portion 37 rotatable in, although longitudinally confined between a pair of ball bearings 38 and 39 held within a fixed cylindrical bearing shell or housing 40 which outwardly presents the appearance of what in Figures 1 and 2 has been designated as the bearing 20, the ball bearings being held in place in the respective ends of the bearing shell 40 by means of a pair of annular retainers 41 having threaded engagement with the shell at 41a.

The ends of the body portion 37 are alike in this embodiment, having tapered sockets 42 and 43 respectively, extending significantly inwardly of the bearings 38 and 39, and into which fit tapered arbors 44 and 45. The arbor 45 has fixed in it the drill 48, while the arbor 44 has fixed upon it as by key-and-groove connection the pulley 19. The arbor 44 has an axial bore into which fits a tie rod 46 having a therad 46a and 46b respectively at each end. The inner threaded end is screwed axially into the tapered end of arbor 45, while the outer threaded end has a lock nut and washer 47a whereby the tapered ends of both arbors 44 and 45 are interlocked and forced to assume and retain a seat in their respective tapered sockets 42 and 43 whereby they become virtually unitary with the body portion 37.

Figure 9:
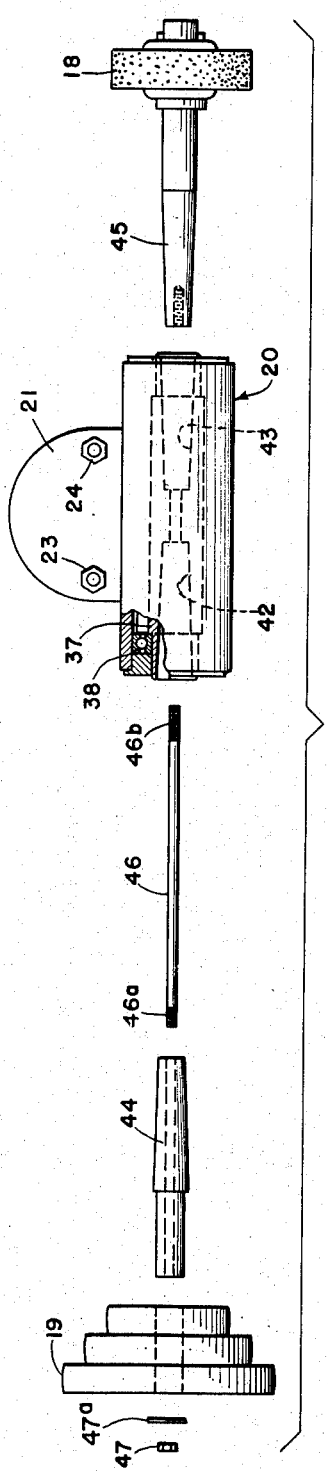
Figure 9 shows the parts of Figure 8 in reduced scale and exploded.

In order to interchange the positions of the drill 48 and the pulley 19 the lock nut 47 is loosened so that the arbors 44 and 45 may be dislodged from their sockets as indicated in Figure 9. The two arbors are then interchanged so as to present the composite tool shaft in an end for end reversed position, whereupon the tie rod 46 is replaced for securing the arbors together and seating them tightly in their sockets.

The preferable form of a taper as the hollow recess is shown because of the well-recognized fact that concentricity between the mating parts is more readily obtained and retained, than can be with either straight-sided, or threaded-sided mating surfaces. Furthermore, the tapered surfaces when properly fitted, may be self-locking, permitting retaining the arbor in the shaft in either direction of rotation.

In the construction according to this invention, when changing the position of the tool from one end of the shaft and shaft housing to the other, the housing remains in place fixed to the tool support, retaining its accurate position and alignment in relation to the work-piece 13, and the shaft 37 remains mounted on the bearings 38 and 39 in the housing 20, thereby avoiding the danger of misalignment or exposure to dirt and dust of the bearings.

In view of such reversal of the tool shaft provision is also made for a simple end-for-end reversal of the drive motor 31. From Figures 6 and 7 it is noted that the motor is held and partly surrounded by a U-shaped bracket 48 fastened to the motor as by screws 49, this U-shaped bracket in turn being fastened as by bolts 50 to a female mounting or casting 51 which fits over a lug portion 52 extending rearwardly from the tool carrier 22 and having with the mounting 51 an adjustable connection indicated by a horizontal slot 53 and a horizontal bolt 54 extending through the slot.

Three modes of end-for-end change of position of the motor are indicated, any one of which provides a ready means for such change, namely, the screws 49 may be removed to allow the motor to be changed in relation to the bracket 48, or the bolts 50 may be removed to allow the bracket to be changed in relation to the mounting casting 51, or the bolt 54 may be removed to allow change of the casting 51 in relation to the lug 52 and the tool carrier 22.

Changes may be made in the above construction such as employing different means for mounting and securing tools and drive pulleys without departing from the spirit of this invention.

What I claim is:

1. A supplementary machine tool unit comprising a frame having a guide member and a base that embodies means for attachment to a supporting surface, a motor supported from the frame, motor support means for adjusting the motor 180° in relation to the base, said motor having a motor shaft, a driving pulley on the motor shaft, a tool shaft housing supported from that side of the frame opposite the motor, means for adjusting the housing in respect to the base, a tool shaft alike at both ends journalled in the housing, a driven pulley, a belt connecting the pulleys, means for mounting the driven pulley at whichever of the alike ends of the tool shaft corresponds with the driving pulley, and means for removably securing a tool on the tool shaft at whichever end of the shaft is opposite the driven pulley.

2. A tool unit according to claim 1, wherein means are additionally provided for reversing the direction of rotation of the motor shaft whereby the tool will rotate in the same relation to the point of its application irrespective of the end of the tool shaft to which it is secured.

3. A tool unit according to claim 1, in which the tool shaft has alike inwardly extending tapered sockets at its ends, the driven pulley is mounted on a shaft with a tapered free end, means for seating the tapered end of the shaft carrying the pulley in either of the alike sockets of the tool shaft, and means for securing a tool with a tapered free end in a socket on the tool shaft at whichever end is opposite the driven pulley.

4. A tool unit according to claim 1, in which the tool shaft has alike inwardly extending tapered sockets at both ends and which has a pair of arbors with shanks complementally tapered to the sockets, of which one arbor carries the tool while the other carries the driven pulley around which the motor-driven belt passes, the arbors being reversibly seated in the sockets in the ends of the tool shaft.

5. A tool unit according to claim 4 which has in addition a tie rod with a threaded end extending axially through one of the arbors with one end screwed into the adjacent inner end of the other of the arbors and means for engaging the other end of the tie rod with the outer end of the arbor through which it passes.

DAVID SANDRIDGE McCULLOUGH.

REFERENCES CITED

The following references are of record in the file of this patent:

UNITED STATES PATENTS

| Number | Name | Date |
|---|---|---|
| 774,027 | Barr | Nov. 1, 1904 |
| 1,053,232 | Sheets | Feb. 18, 1913 |
| 1,073,678 | Moor | Sept. 23, 1913 |
| 1,719,689 | Buehrle | July 2, 1929 |
| 1,980,872 | Moul | Nov. 13, 1934 |
| 2,074,844 | Hill | Mar. 23, 1937 |
| 2,127,210 | Dunbar | Aug. 16, 1938 |
| 2,258,071 | Sherrill | Oct. 7, 1941 |
| 2,453,020 | Koett | Nov. 2, 1948 |